(12) United States Patent
Schoenfelder

(10) Patent No.: US 11,401,004 B2
(45) Date of Patent: Aug. 2, 2022

(54) ELECTRIC MOTOR, DRIVE, AND ASSEMBLY FOR TRACKED VEHICLE, SUCH AS A SNOWMOBILE

(71) Applicant: Black Diamond Xtreme Engineering, Inc., Cannon Falls, MN (US)

(72) Inventor: Ray Schoenfelder, Cannon Falls, MN (US)

(73) Assignee: BLACK DIAMOND XTREME ENGINEERING, INC., Cannon Falls, MN (US)

( * ) Notice: Subject to any disclaimer, the term of this patent is extended or adjusted under 35 U.S.C. 154(b) by 212 days.

(21) Appl. No.: 16/430,936

(22) Filed: Jun. 4, 2019

(65) Prior Publication Data

US 2019/0367128 A1 Dec. 5, 2019

Related U.S. Application Data

(60) Provisional application No. 62/680,159, filed on Jun. 4, 2018.

(51) Int. Cl.
*B62M 6/70* (2010.01)
*B62M 6/90* (2010.01)
*B62D 25/20* (2006.01)
*B62M 27/02* (2006.01)

(52) U.S. Cl.
CPC ........... *B62M 6/70* (2013.01); *B62D 25/2072* (2013.01); *B62M 6/90* (2013.01); *B60Y 2200/252* (2013.01); *B62M 2027/027* (2013.01)

(58) Field of Classification Search
CPC .......... B62M 6/70; B62M 6/90; B62M 27/02; B62M 27/027; B62D 27/2072; B62D 55/12; B62D 55/135
See application file for complete search history.

(56) References Cited

U.S. PATENT DOCUMENTS

| | | | | |
|---|---|---|---|---|
| 3,568,787 | A * | 3/1971 | Gremeret | A63C 5/085 180/181 |
| 4,966,242 | A * | 10/1990 | Baillargeon | B62D 53/021 180/242 |
| 7,798,886 | B1 * | 9/2010 | Williamson | B62D 51/007 446/456 |
| 10,071,303 | B2 * | 9/2018 | Pikulski | A63C 17/016 |
| 2008/0012422 | A1 * | 1/2008 | Streitz | B62D 55/10 305/122 |
| 2010/0060075 | A1 * | 3/2010 | Hansen | B62D 55/04 305/15 |
| 2012/0206004 | A1 * | 8/2012 | Wishart | B62M 6/45 310/121 |
| 2014/0246257 | A1 * | 9/2014 | Jacobsen | B62D 55/0655 180/14.2 |
| 2015/0314826 | A1 * | 11/2015 | Zusy | B62K 21/00 280/267 |
| 2017/0113119 | A1 * | 4/2017 | Burger | A63C 5/035 |

(Continued)

*Primary Examiner* — Kevin Hurley
*Assistant Examiner* — Maurice L Williams
(74) *Attorney, Agent, or Firm* — Westman, Champlin & Koehler, P.A.; Z. Peter Sawicki; Amanda M. Prose

(57) ABSTRACT

An electric motor, drive, and assembly for a tracked vehicle. The assembly including an electric motor, a cylindrical housing encircling the electric motor and adapted for rotation about the motor, and a drive sprocket. The drive sprocket is coupled to the housing and having teeth to generally engage a track of the tracked vehicle.

16 Claims, 5 Drawing Sheets

(56) References Cited

U.S. PATENT DOCUMENTS

| | | | | |
|---|---|---|---|---|
| 2017/0253297 A1* | 9/2017 | Christini | ................ | B62D 55/06 |
| 2017/0267296 A1* | 9/2017 | Martel | ................... | A63C 11/10 |
| 2017/0341690 A1* | 11/2017 | Pikulski | ............... | B62D 51/001 |
| 2019/0001770 A1* | 1/2019 | Barani | .................. | B60F 3/0038 |

* cited by examiner

ELECTRIC MOTOR, DRIVE, AND ASSEMBLY FOR TRACKED VEHICLE, SUCH AS A SNOWMOBILE

CROSS REFERENCE TO RELATED APPLICATIONS

This application claims priority to U.S. Provisional Patent Application No. 62/680,159 filed Jun. 4, 2018 to the above named inventor and is herein incorporated by reference in its entirety.

FIELD OF THE INVENTION

The present disclosure relates generally to a drive assembly and electric motor configured for propelling a snowmobile or other tracked vehicle.

BACKGROUND

A snowmobile, as it exists within the current prior art, is most generally described as a vehicle having a drive assembly utilizing a track and a steering assembly utilizing skis. A typical snowmobile utilizes an internal combustion engine as a power source for the track and drive mechanisms. As the need for vehicles that produce less of a carbon footprint is increasing, there is a push for the development of vehicles utilizing alternate drive mechanisms and power systems. One common solution within the art and currently in use for traditional road traveling vehicles is the substitution of the gasoline combustion engine with an electric motor.

Unlike a traditional wheeled vehicle, there are unique properties and inherent difficulties in simply swapping out the internal combustion engine for an electric motor mated to the standard drive system of a tracked vehicle, such as a snowmobile.

Therefore, there is a need for an improved drive system, motor assembly, and electric motor configured for use with a tracked vehicle, such as a snowmobile.

SUMMARY OF THE INVENTION

The system and device assembly of the present disclosure is generally configured to provide an electric motor and drive assembly for propelling and powering a track portion of a tracked vehicle. The assembly generally comprises an electric motor coupled to a power source, such as a battery, and mounted to a chassis portion of the vehicle for placement within a skid frame assembly. This assembly generally eliminates several components and system of a traditional vehicle utilizing a gas combustion engine, such as, but not limited to, fuel, oil, lubricants, coolants, clutches, belts, braking systems, cables, and control systems.

The electric motor used within the system of the present disclosure comprises a cylindrical housing that rotates about the motor along a fixed axis generally parallel to the track portion of the vehicle. Accordingly, this rotation of the cylindrical housing about the motor moves the track directionally along a length of the vehicle to propel the vehicle and encircling the skid frame assembly.

The motor housing further comprises at least one drive sprocket affixed to an exterior portion. The drive sprocket configured with teeth or lugs for generally engaging a corresponding groove of the track interior in an intermeshed coupling. Preferably, the drive sprocket is integrated directly into the shape of the housing through a molding or other similar process for generally permanently affixing the sprocket to the housing.

The motor assembly is generally adapted for positioning within the skid frame assembly and configured for placement and integration with an existing snowmobile assembly, wherein the motor is configured for replacing the traditional drive sprocket axle and pulley assembly. Accordingly, the motor and housing can be configured as a retrofit assembly to existing snow machines, wherein the motor coupling includes a simplified electrical harness for coupling to the power source and motor controls.

The motor assembly further can be configured for placement at an either end of an interior of the track assembly, wherein it can be utilized to generally push or pull the track about the drive sprocket.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWING(S)

DETAILED DESCRIPTION OF THE INVENTION

Figure 1:
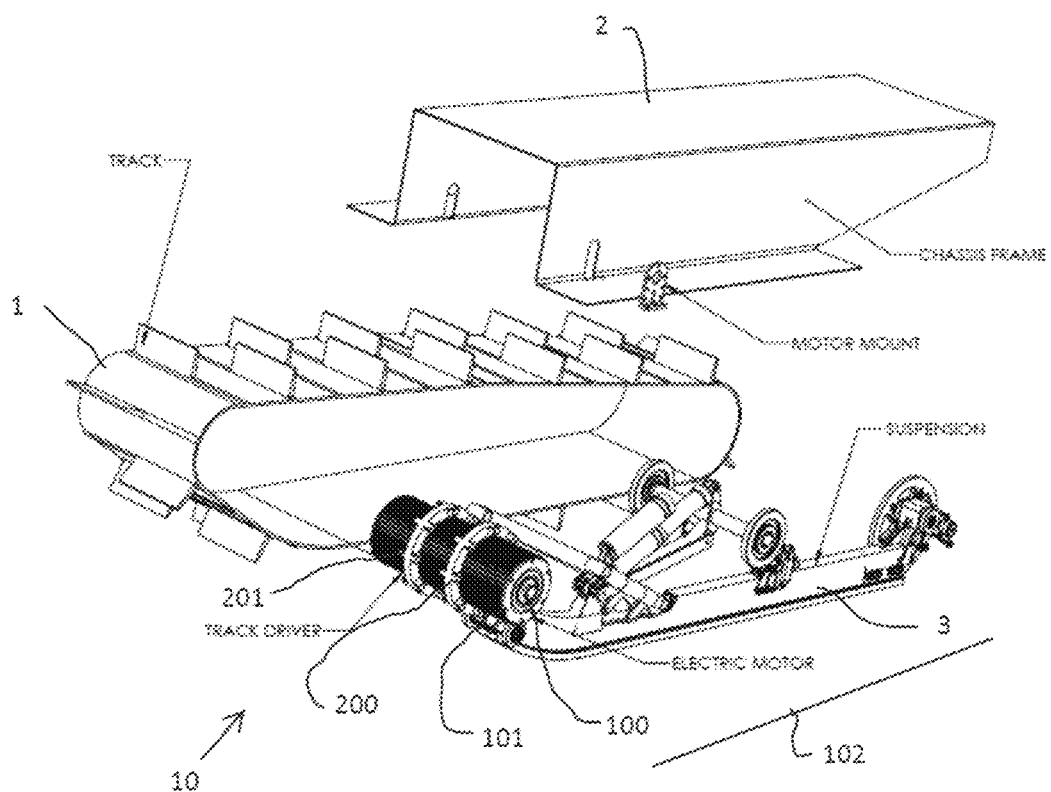
FIG. 1 is an isometric view of the assembly, according to the present disclosure.

The following detailed description includes references to the accompanying tables and figures, which form a part of the detailed description. The tables and figures show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The system and device assembly of the present disclosure is generally configured to provide an electric motor and drive assembly for propelling and powering a track portion of a tracked vehicle.

Figure 2:
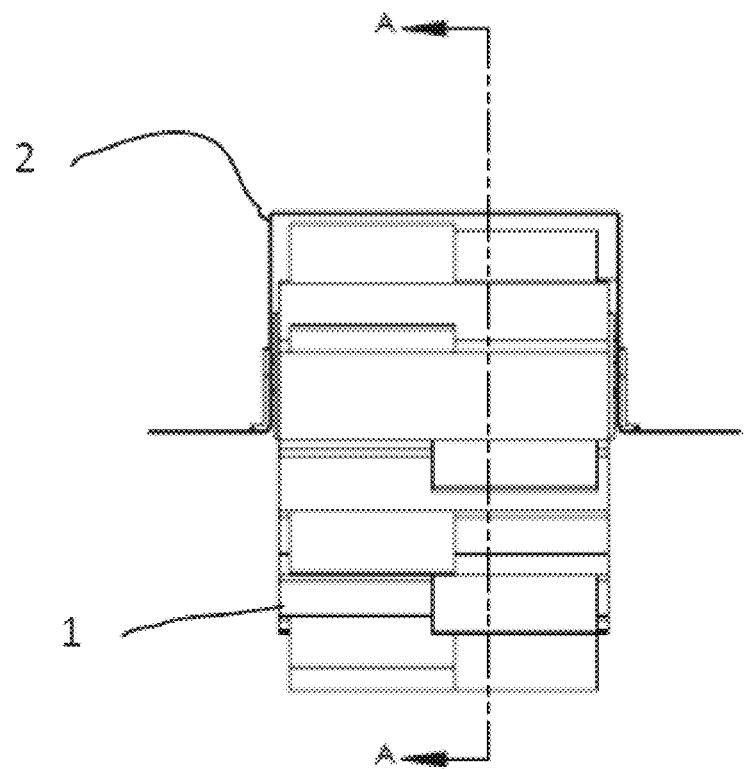
FIG. 2 is a front side view of the track portion encircling the assembly, according to the present disclosure.
Figure 3:
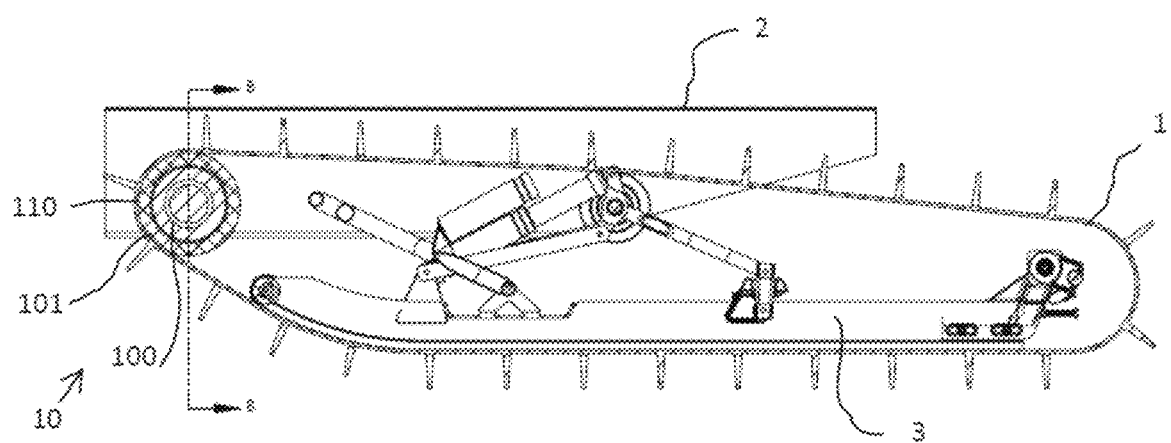
FIG. 3 is a side view of the assembly along section line A-A of FIG. 2, according to the present disclosure.
Figure 4:
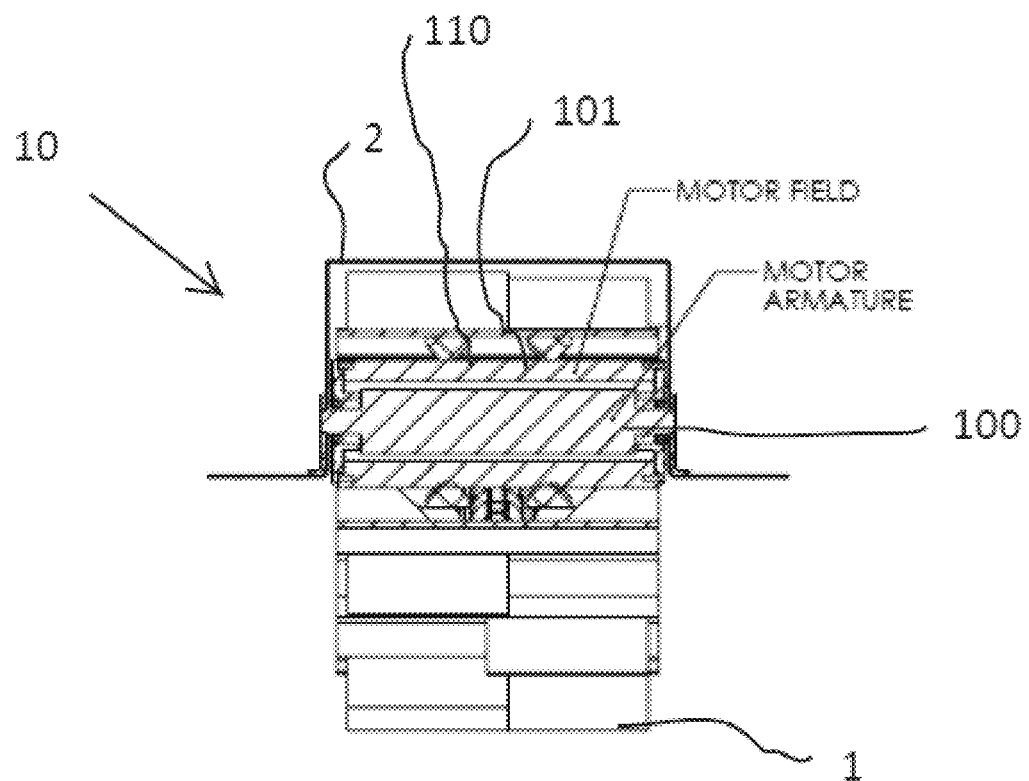
FIG. 4 is a front side view of the assembly along section line B-B of FIG. 3, according to the present disclosure.
Figure 5:
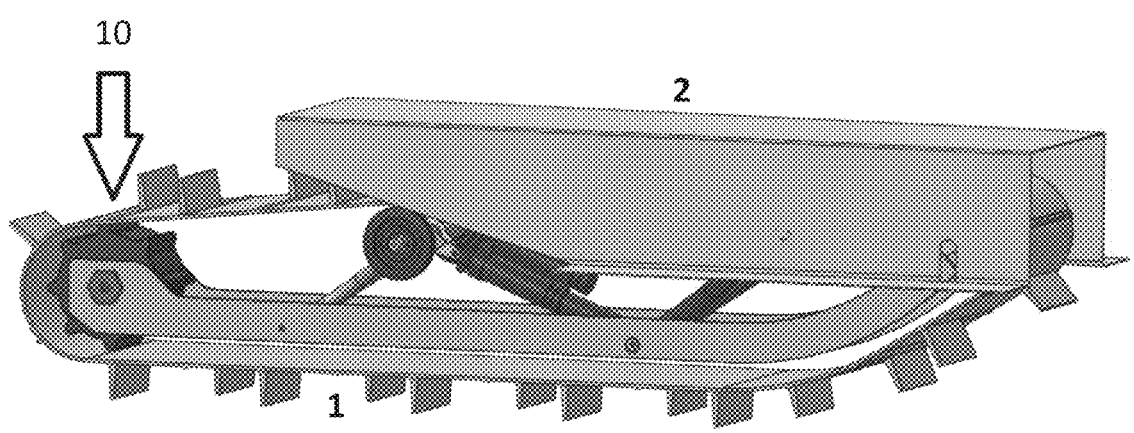
FIG. 5 is an isometric view of the assembly positioned at a rear of the track portion, according to the present disclosure.

Referring now to FIGS. 1-5 of the electric motor, drive and assembly of the present disclosure, generally referred to as device 10. The device 10 is generally comprised of an electric motor 100 configured to drive a track 1 portion of a tracked vehicle. The motor 100 is coupled to a power source (not pictured) for providing power to the motor 100 for operation. Preferably, the power source is a battery providing a direct current to the motor 100. The motor 100 having an armature configured for attachment to a chassis 2 of the vehicle the motor 100 is mounted on and within a skid frame 3 assembly.

The motor 100 comprises a cylindrical housing 101 rotating about the motor 100 along a fixed axis of the armature generally parallel to the track 1 portion of the vehicle. Accordingly, this rotation moves the track 1 directionally along a length 102 of the vehicle track portion 1 to propel the vehicle and encircling the skid frame 3 assembly.

The motor housing 101 including at least one drive sprocket 200 affixed to an exterior portion 110 of the housing 101. The drive sprocket 200 comprising teeth 201 or, as they are sometimes called, lugs for engaging a correspondingly sized groove (not pictured) of the track 1 interior in an intermeshed coupling.

Preferably, the drive sprocket 200 is integrated directly into the shape of the housing 101 exterior 110 through a molding or other similar process for generally permanently affixing the sprocket to the housing 101. In an alternate embodiment, the drive sprocket 200 or the teeth portion 201 of the drive sprocket 200 are configured in an assembly, wherein the sprocket 200 or teeth 201 can be fastened to the rotating exterior portion 110 portion of the housing 101. Accordingly, the teeth 201 are generally provided in a size, dimension, or pitch dependent upon the corresponding grooves and manufacturer of the track portion 1.

The motor assembly 10 is generally adapted for positioning within the skid frame assembly 3 and configured for placement and integration with an existing snowmobile assembly, wherein the motor 100 is configured for replacing the traditional drive sprocket axle and pulley assembly. Accordingly, the motor 100 and housing 101 can be configured as a retrofit assembly to existing snow machines, wherein the motor 100 coupling includes a simplified electrical harness for coupling to the power source and motor controls. Generally, the motor assembly 10 is configured for placement within the skid frame 3 in a manner allowing for the use of a traditional snow machine suspension assembly, track, and frame.

Alternately, the motor assembly 10 is positioned within the skid frame assembly at a rear portion of the skid frame 3, wherein the motor 100 is swapped out with the traditional rear suspension components. In this alternate placement, the motor 100 position enables the track portion 1 to be pulled from the front of the vehicle towards the rear of the vehicle resulting in a more effective transfer of power from the motor 100 to the ground for powering the vehicle.

In the preferred assembly of the present invention, the motor 100 and housing 101 are a single functional unit, wherein the motor 100 is the armature and the housing 101 is the field. Accordingly, the housing 101 field will rotate about the motor 100 armature when power is applied.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A motor configured for the propulsion of a track of a snowmobile, the motor comprising:
   an electric drive;
   a housing, the housing cylindrical and encircling the electric drive, wherein the housing is rotated about the electric drive; and
   a drive sprocket, the drive sprocket coupled to the housing in a fixed position and in an engagement with the track, wherein the drive sprocket is rotated along with the housing to move the track and propel the snowmobile.

2. A motor as in claim 1, wherein the drive sprocket is integrated directly into the housing.

3. A motor as in claim 1, wherein the drive sprocket is removably fastened to the housing.

4. A motor as in claim 1, wherein the motor is configured as a retrofit assembly for existing snowmobiles.

5. A drive system for the track portion of a snowmobile, the track portion having grooves, the drive system comprising:
   an electric motor;
   a power source, the power source coupled to the electric motor;
   a housing, the housing cylindrical and encircling the electric motor, wherein the housing is rotated about the electric motor upon activation of the power source; and
   a drive sprocket, the drive sprocket coupled to the housing in a fixed position, wherein the drive sprocket is rotated along with the housing in an intermeshed coupling with the grooves of the track portion to propel the track portion and thus move the snowmobile.

6. A drive system as in claim 5, wherein the system includes a skid frame assembly, wherein the electric motor and housing are included within the skid frame assembly.

7. A drive system as in claim 6, wherein the motor is positioned at a rear of the skid frame assembly.

8. A drive system as in claim 5, wherein the drive sprocket coupling is integrated directly into the housing.

9. A drive system as in claim 5, wherein the drive sprocket coupling is removably fastened to the housing.

10. A drive system as in claim 5, wherein the electric motor is an armature and the housing is a field rotating about the armature.

11. A skid frame assembly for a snowmobile, the skid frame assembly affixed to a chassis and having a front portion aligned with a front of the tracked vehicle and a rear portion aligned with a rear of the snowmobile, the skid frame assembly comprising:
    a track, the track encircling the skid frame assembly and having a plurality of grooves;
    an electric motor;
    a power source, the power source coupled to the electric motor;
    a housing, the housing cylindrical and encircling the electric motor, wherein the housing is rotated about the electric motor upon activation of the power source; and
    a drive sprocket, the drive sprocket coupled to the housing and having a plurality of teeth, the teeth sized for engagement with the grooves of the track portion in an intermeshed coupling, wherein the drive sprocket is rotated along with the housing to propel the track portion.

12. The skid frame assembly of claim 11, wherein the motor is positioned at the rear of the skid frame assembly.

13. The skid frame assembly of claim 11, wherein the motor is positioned at the front of the skid frame assembly.

14. The skid frame assembly of claim 11, wherein the drive sprocket coupling is integrated directly into the housing.

15. The skid frame assembly of claim 11, wherein the drive sprocket coupling is removably fastened to the housing.

16. The skid frame assembly of claim 11, wherein the electric motor is an armature and the housing is a field rotating about the armature.

* * * * *